US008677228B2

(12) United States Patent
Matsuki et al.

(10) Patent No.: US 8,677,228 B2
(45) Date of Patent: Mar. 18, 2014

(54) RECORDING MEDIUM FOR CREATING ELECTRONIC ALBUM

(75) Inventors: Akira Matsuki, Kanagawa (JP); Tadahiro Ohata, Kanagawa (JP)

(73) Assignee: Sony Corporation, Tokyo (JP)

( * ) Notice: Subject to any disclaimer, the term of this patent is extended or adjusted under 35 U.S.C. 154(b) by 773 days.

(21) Appl. No.: 10/576,512

(22) PCT Filed: Oct. 22, 2004

(86) PCT No.: PCT/JP2004/016068
§ 371 (c)(1), (2), (4) Date: Apr. 20, 2006

(87) PCT Pub. No.: WO2005/041069
PCT Pub. Date: Jun. 5, 2005

(65) Prior Publication Data
US 2007/0101247 A1 May 3, 2007

(30) Foreign Application Priority Data
Oct. 23, 2003 (JP) ................................. 2003-363588

(51) Int. Cl.
*G06F 17/00* (2006.01)
(52) U.S. Cl.
USPC .......................................... 715/200; 715/202
(58) Field of Classification Search
USPC .................................................. 715/200, 202
See application file for complete search history.

(56) References Cited

U.S. PATENT DOCUMENTS

| 5,655,053 A * | 8/1997 | Renie ............................. 386/117 |
| 5,703,995 A * | 12/1997 | Willbanks ........................ 386/52 |
| 7,155,336 B2 * | 12/2006 | Dorfman et al. ............... 701/200 |
| 2002/0007311 A1* | 1/2002 | Iseki et al. ....................... 705/14 |
| 2002/0138843 A1* | 9/2002 | Samaan et al. ................... 725/87 |
| 2003/0051207 A1 | 3/2003 | Kobayashi et al. |

FOREIGN PATENT DOCUMENTS

| JP | 09-069114 | 3/1997 |
| JP | 10-233985 | 9/1998 |
| JP | 2000-311084 | 11/2000 |
| JP | 2001-036842 | 2/2001 |
| JP | 2001-229166 | 8/2001 |
| JP | 2001-256235 | 9/2001 |

(Continued)

OTHER PUBLICATIONS

Frohlich, et al., "Requirements for photoware", Copyright ACM 2002, Proceedings of the 2002 ACM conference on computer supported cooperative work, p. 166-175.*

(Continued)

*Primary Examiner* — Amelia Rutledge
(74) *Attorney, Agent, or Firm* — Sherr & Jiang, PLLC

(57) ABSTRACT

A recording medium on which material information and a program are recorded for a user to create an original electronic album in relation to a sightseeing spot, wherein the material information is recorded with situational information, such as location, date, and time, added to information, such as text, images, audio, and maps related to this sightseeing spot, and the program is made to automatically or selectably display material information related to the situational information, such as location, date, and time, recorded with images and the like prepared by a user. Thus, it is possible to create an original electronic album by oneself relatively easily.

20 Claims, 7 Drawing Sheets

(56) References Cited

FOREIGN PATENT DOCUMENTS

| | | |
|---|---|---|
| JP | 2002-324229 | 11/2002 |
| JP | 2002-358310 | 12/2002 |
| JP | 2003-085265 | 3/2003 |
| JP | 2003-122576 | 4/2003 |
| JP | 2003-143329 | 5/2003 |
| JP | 2003-174578 | 6/2003 |
| JP | 2003-214889 | 7/2003 |

OTHER PUBLICATIONS

Madhwacharyula, et al., "An Information-integration Approach to Designing Digital Video Albums", copyright 2003, IEEE, p. 1-5.*

Hewagamage, et al., "Augmented Album: Situation-dependent System for a Personal Digital Video/Image Collection", copyright 2000, IEEE, p. 323-26.*

Communication Issued in Counterpart European Application No. 04793176.1-1527/1677211, dated Nov. 2, 2010 (4 pages).

* cited by examiner

DESIRED SIGHTSEEING INFORMATION TYPE SELECTION

INFORMATION YOU WISH TO ADD TYPE SELECTION

☐ VISUAL INFORMATION
   ☐ IMAGES OF BUILDINGS AT SIGHTSEEING SPOTS
   ☐ IMAGES OF LANDSCAPES AT SIGHTSEEING SPOTS
   ☐ IMAGES OF SPECIAL EVENTS (FESTIVALS AND THE LIKE)
   ☐ OTHER IMAGES AT SIGHTSEEING SPOTS
   ☐ OTHERS

☐ TEXTUAL INFORMATION
   ☐ INFORMATION ON SIGHTSEEING SPOTS AND PLACES OF INTEREST
   ☐ EPISODES
   ☐ OTHERS

☐ MAPS

☐ NARRATIVE INFORMATION
   ☐ INFORMATION ON SIGHTSEEING SPOTS AND PLACES OF INTEREST
   ☐ EPISODES
   ☐ OTHERS

☐ MUSIC
   ☐ LOCAL MUSIC
   ☐ SELECT BY THEME, ATMOSPHERE

☐ OTHERS

FIG. 3

THE FOLLOWING INFORMATION IS AVAILABLE
PLEASE CHECK THE ONES DESIRED

| | TYPE OF INFORMATION | NAME OF SIGHTSEEING SPOTS 1 | NAME OF SIGHTSEEING SPOTS 2 | TITLE OF INFORMATION | RECORDED DATE AND TIME | | | | | | | WEATHER INFORMATION | FILE FORMAT |
|---|---|---|---|---|---|---|---|---|---|---|---|---|---|
| | | | | | YEAR | MONTH | DAY | HOUR | MINUTE | SEASON | DAY/NIGHT | | |
| ☐ | STILL IMAGE | ROMAN MONUMENTS | THE COLOSSEUM | ENTIRE VIEW | 1998 | 4 | 8 | 11 | 15 | SPRING | DAY TIME | CLOUDY | JPG |
| ☐ | STILL IMAGE | ROMAN MONUMENTS | FORO ROMANO | XX PALACE | 2002 | 10 | 25 | 12 | 23 | AUTUMN | DAY TIME | SUNNY | JPG |
| ☐ | MOVING IMAGE | FLORENCE | THE DUOMO | SUN RISE ON THE DUOMO | 2003 | 1 | 5 | 7 | 35 | WINTER | EARLY MORNING | SUNNY | MPG2 |
| ☐ | STILL IMAGE | SICILY | MOUNT ETNA | ERUPTION OF MOUNT ETNA | 2001 | – | – | – | – | WINTER | – | – | JPG |
| ☐ | MUSIC | ITALY | | ITALIAN FOLK SONG 01 | 1958 | – | – | – | – | – | – | – | MP3 |
| ☐ | MAP | FLORENCE | | DETAILED MAP OF FLORENCE | 1958 | – | – | – | – | – | – | – | JPG |

[ VIEW/LISTEN TO SAMPLE ]

TOTAL AMOUNT AND PRICE OF INFORMATION SELECTED UP TO THIS POINT
A TOTAL OF THREE ITEMS OF INFORMATION ARE SELECTED
TOTAL AMOUNT OF DATA 125MByte

PROCEED WHEN FINISHED SELECTING [ NEXT ]

FIG. 4

RECORDING MEDIUM FOR CREATING ELECTRONIC ALBUM

TECHNICAL FIELD

The present invention relates to a recording medium and electronic album creating apparatus that are suitable for use in creating an original electronic album for when a user goes on a sightseeing trip and the like.

BACKGROUND ART

Heretofore, for example, when one wants to create an original electronic album oneself after going on a sightseeing trip, by adding, to moving images or still images captured by oneself, images of famous places of interest of which one could not capture oneself or images of paintings for which photographing is prohibited, to edit them, the one is to find information from video tapes or CD-ROMs sold at sightseeing spots on which sightseeing information is recorded or from the Internet and the like by oneself and copies and edits them, or the one scans picture postcards, commercially produced slides, guidebooks and the like to make computerized images to add.

In Japanese Patent Application Publication No. 2002-358310, description is made of a technique where, instead of creating an electronic album by oneself, a service provider creates an attractive original album by obtaining attractive contents automatically based on event information.

However, conventionally, in order to create an original electronic album oneself, one had to find by oneself information to be added from video tapes or CD-ROMs on which sightseeing information is recorded or from the Internet and the like and copy and edit them, or the one had to scan picture postcards, commercially produced slides, guidebooks and the like to make computerized images to be added. Accordingly, there is a problem in that creating an original electronic album oneself is extremely complicated and difficult.

DISCLOSURE OF THE INVENTION

Taking the above circumstances into consideration, the present invention has an object of making it possible to create an original electronic album oneself relatively easily.

The recording medium of the present invention is a recording medium on which material information and a program for a user to create an original electronic album in relation to a sightseeing spot. This material information is recorded with situational information such as location, date, and time added to information, such as text, images, audio and maps related to this sightseeing spot. This program automatically or selectably displays material information related to the situational information, such as location, date, time, that is recorded with images and the like prepared by the user.

According to the recording medium of the present invention, situational information, such as location, date, time is added to information, such as text, images, audio, and maps related to a sightseeing spot. Accordingly, it is possible to search information such as text, images, audio, maps using this situational information, such as location, date, time, and obtain desired information easily. Therefore, one can create an original electronic album oneself relatively easily.

BRIEF DESCRIPTIONS OF THE DRAWINGS

FIG. 1 is a system diagram for describing an example of a best mode for implementing an electronic album creating apparatus of the present invention.

FIG. 2 is a flow chart for describing the present invention.
FIG. 3 is a diagram for describing the present invention.
FIG. 4 is a diagram for describing the present invention.
FIG. 5 is a diagram for describing the present invention.
FIG. 6 is a diagram for describing the present invention.
FIG. 7 is a block diagram showing an example of an electronic album creating apparatus of the present invention.

BEST MODES FOR CARRYING OUT THE INVENTION

Hereinafter, examples of the best modes for implementing a recording medium and an electronic album creating apparatus of the present invention will be described with reference to the drawings.

FIG. 1 shows a configuration example of an electronic album creating system. In FIG. 1, numeral 1 indicates, for example, an electronic camera that a user carried while traveling to a certain sightseeing spot, and this electronic camera 1 obtains electronic images such as moving images and still images by capturing images of desired subject at sightseeing spots and the like.

In addition, this electronic camera 1 records the place (location) at which images are captured and the date and time of capture in relation to these captured images of sightseeing spots and the like. In this case, a detachable recording medium can be attached so as to be loadable into this electronic camera 1, and the captured images can be related to the capture place (location) and the date and time of capture, to be recorded on this recording medium by recording means.

As capture place (location) information, there can be used current position information that is obtained based on position information of a base station with which a mobile phone, PHS or the like, which is carried by the user, communicates mutually, or current position information acquired by using GPS and the like.

In FIG. 1, numeral 2 indicates a recording medium on which information, such as text, images, audio and maps related to the sightseeing spot is recorded, sold at souvenir shops 3 or the like at a sightseeing spot.

In the present example, situational information such as location, date and time is added and recorded with the information, such as text, images, audio, and maps recorded on this recording medium 2.

In the present example, a user purchases this recording medium 2 at the souvenir shops 3 or the like at a sightseeing spot. This recording medium 2 is produced by a sightseeing information providing service company 4. The sightseeing information providing service company 4 delivers this recording medium 2 to the souvenir shops 3 at the sightseeing spot, and receives consideration (payment) from the souvenir shops 3 or the like at this sightseeing spot.

Further, this sightseeing information company 4 writes into an information updating service server 4a the information recorded on this recording medium 2, such as text, images, audio and maps.

In the present example, an ID (identification number) is added to this recording medium 2. This ID is identified when a purchaser (user) 5 of this recording medium 2 connects with this information updating service server 4a via a network 6 using this ID. In the case where this ID is confirmed, it is made possible for the purchaser of this recording medium 2 to receive via this network 6 the newest information of the information recorded on this recording medium 2.

Next, using the flow chart in FIG. 2, a procedure where the user 5 creates an electronic album by himself/herself will be described.

First, electronic images such as moving images and still images captured by the user 5 at a sightseeing spot with the electronic camera 1 are inputted (hard disk HD and the like) to a personal computer 10 constituting an electronic album creating apparatus to store them (step S1).

Next, the recording medium (a CD-ROM, for example) 2 on which sightseeing information is recorded and purchased by the user 5 at the souvenir shops 3 at a certain sightseeing spot is set in the personal computer 10 so as to be readable (step S2).

Next, it is determined whether the sightseeing information is to be updated (step S3). If the most up-to-date information is not to be used as the sightseeing information, proceeding to step S4 and selecting the desired type of sightseeing information recorded on the recording medium 2.

In this step S3, if the sightseeing information is to be updated, the personal computer 10 is connected with the information updating service server 4*a* of the sightseeing information providing service company 4 via the network 6. After the ID of the recording medium 2 is confirmed, the user 5 receives the newest information of the text, images, audio, maps and the like recorded on the recording medium 2. This newest information is stored in the memory of the personal computer 10 (step S5), and then, the process proceeds to step S4.

In this step S4, a menu shown in FIG. 3, for example, is displayed on the screen of the personal computer 10, and the user 5 selects the type of information that the user wishes to add to the electronic images such as moving images and still images captured by himself/herself.

For example, visual information, textual information, maps, narrative information, music and others can be selected. As the visual information, there can be selected images of buildings of sightseeing spots, images of landscapes of sightseeing spots, images of special events (festivals and the like), other images of sightseeing spots and others. As the textual information, there can be selected information on sightseeing spots and places of interest, episodes and others. As the narrative information, there can be selected information on sightseeing spots and places of interest and others. As the music, there can be selected local music, or by theme and by atmosphere.

In this step S4, when the type of sightseeing information is selected, it is determined whether location information and date and time information are included with the captured image captured by the user 5 (step S6). If location information and date and time information are included with the captured image captured by the user 5, a detailed sightseeing information list shown in FIG. 4 is displayed, which is related to these location information and date and time information and recorded on the recording medium 2 (step S7).

In step S6, if the location information and date and time information are not included with the captured image captured by the user 5, the location information and date and time information are selected (step S8), and proceeding to step S7 and displaying a detailed sightseeing information list shown in FIG. 4, which is related to these location information and date and time information and recorded on the recording medium 2.

Next, the desired sightseeing information is selected from the detailed sightseeing information list (step S9). Next, it is determined whether the content of the selected desired sightseeing information is to be checked (step S10). If it is to be checked, proceeding to step S11 and replaying the selected sightseeing information to check the sightseeing information, and the process then returns to step S9.

In this step S10, if the content of the desired sightseeing information is not to be checked, proceeding to step S12 and determining if items are suitable as the selected information. If, in this step S12, the items are not suitable as the selected information, returning to step S9 again and selecting the desired sightseeing information.

If, in this step S12, it is determined that the items are suitable as the selected information, proceeding to step S13 and determining whether his/her own (user 5) comment and title are to be added. If his/her own comment and title are to be added, a comment and title are input (step S14).

After the comment or title is input in this step S14, the process proceeds to step S15. If it is determined that his/her own comment and title are not to be added in this step S13, the process proceeds to step S15. The process proceeds to this step S15. In this step S15, it is determined whether a simulation of the edition is to be replayed.

If it is determined in this step S15 that the simulation is to be replayed, proceeding to step S16 and performing an edit simulation playback. After that, it is determined whether the edit result is satisfied (step S17). If it is determined that this edit result is unsatisfied, returning to step S9 and selecting the desired sightseeing information.

If it is determined in this step S17 that the edit results is satisfied, the process proceeds to step S18. In addition, the process also proceeds to step S18 if it is determined in step S15 that the simulation playback of the edition is not to be performed. In this step S18, an electronic album in which an electronic album is edited and produced is recorded on a new recording medium, that is, recoded on recording media like DVDs such as DVD-R, DVD-RW, DVD+RW, and DVD-ROM, CD-ROMs such as CD-R, and CD-RW or floppy disks (registered trademark), whereby the creation of the electronic album is finished.

FIG. 5 and FIG. 6 each show an example of a playback screen for an edited electronic album.

FIG. 5 shows an example of the playback screen in which images G1 captured by a user are arranged with images G2 of places of interest at that sightseeing trip region, an image G3 of that region, a map G4, a vehicle G5, a beautiful landscape G6 and the like.

As described above, in the present example, on a recording medium sold at a sightseeing spot on which information, such as text, images, audio and maps related to this sightseeing spot is recorded, situational information such as location, date and time are added to the information, such as text, images, audio, and maps related to the sightseeing spot. Accordingly, it is possible to search for this information of text, images, audio, maps and the like by means of this situational information of location, date, time and the like, and it is possible to obtain the desired information with ease.

Further, according to the present example, by confirming the ID of the recording medium, it is possible to receive via a network the newest information for the information recorded on the recording medium.

Furthermore, since the electronic album creation of the present example makes use of situational information such as location, date, and time, searches on sightseeing information become easy, and a user can create an original electronic album by himself/herself relatively easily.

Figure 7:
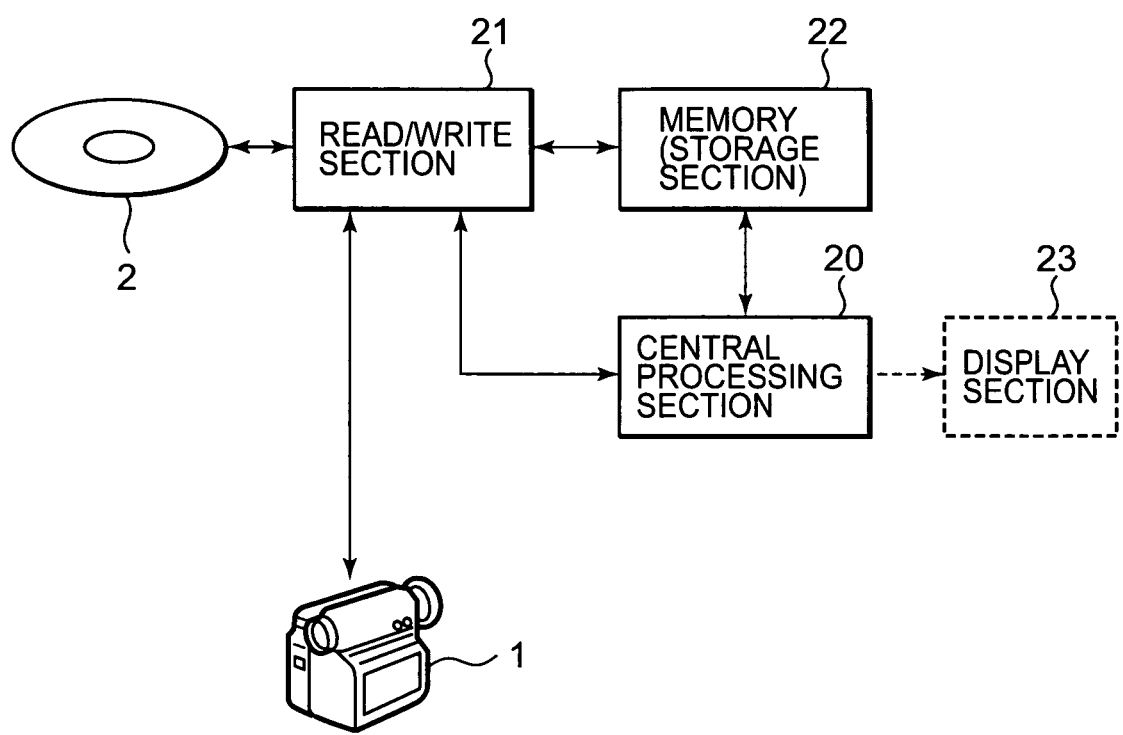

In the example described above, the personal computer 10 is taken to be as an electronic album creating apparatus, but a dedicated electronic album creating apparatus as shown in FIG. 7 may be used in place thereof.

The user 5 described in relation to FIG. 7 first reads electronic images such as moving images and still images captured with the electronic camera 1 at a certain sightseeing spot from a recording medium of the electronic camera 1 via a read/write section 21 and stores them in a memory 22, in accordance with instructions from a central processing section 20 constituted by a microcomputer or the like, and also reads information on the sightseeing spot from the recording medium 2, such as a CD-ROM purchased at the sightseeing spot, on which the information about the sightseeing spot is recorded, via the read/write section 21 and stored them in the memory 22. In FIG. 7, numeral 23 indicates a display section.

Figure 1:
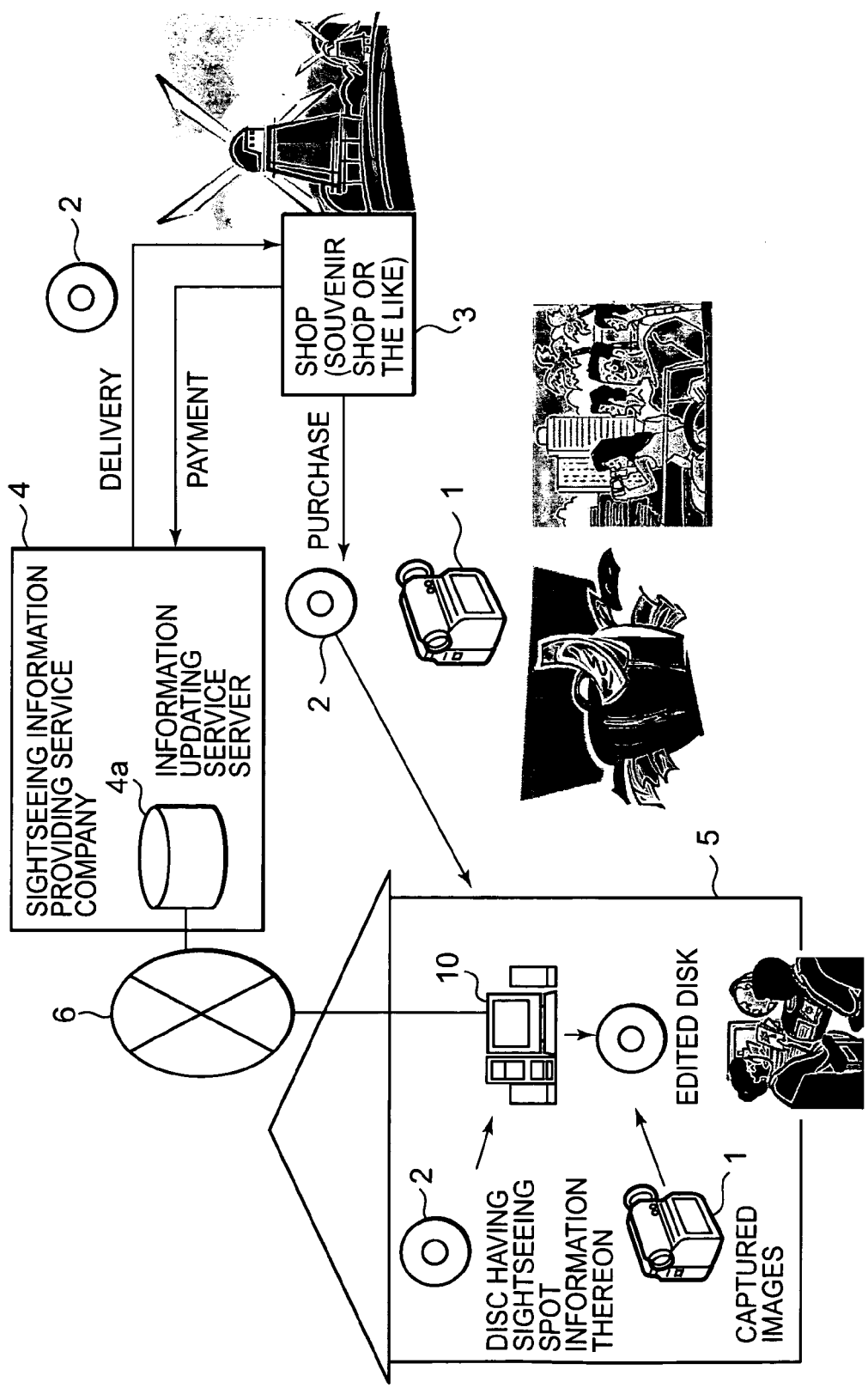
Figure 2:
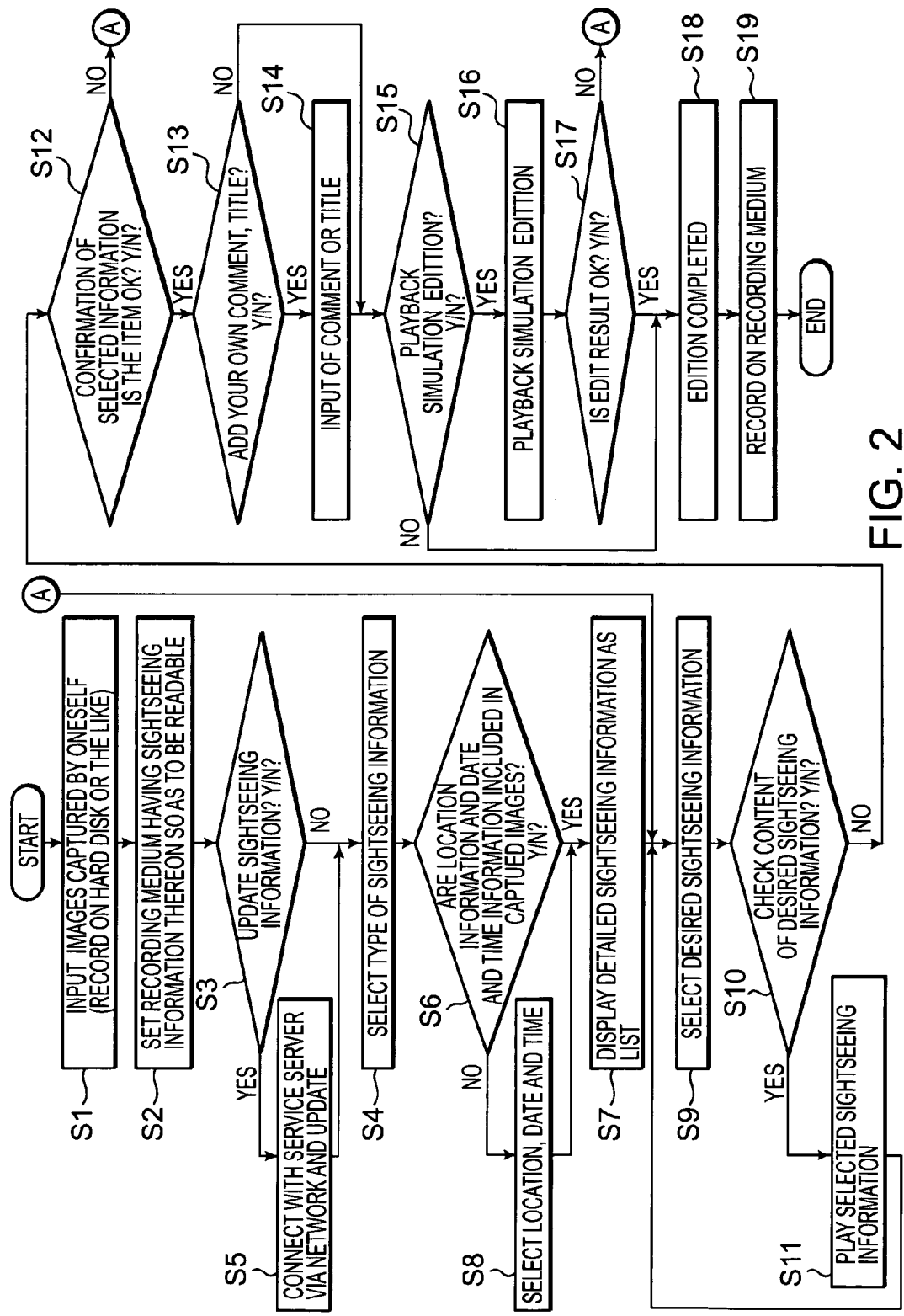
Figure 5:
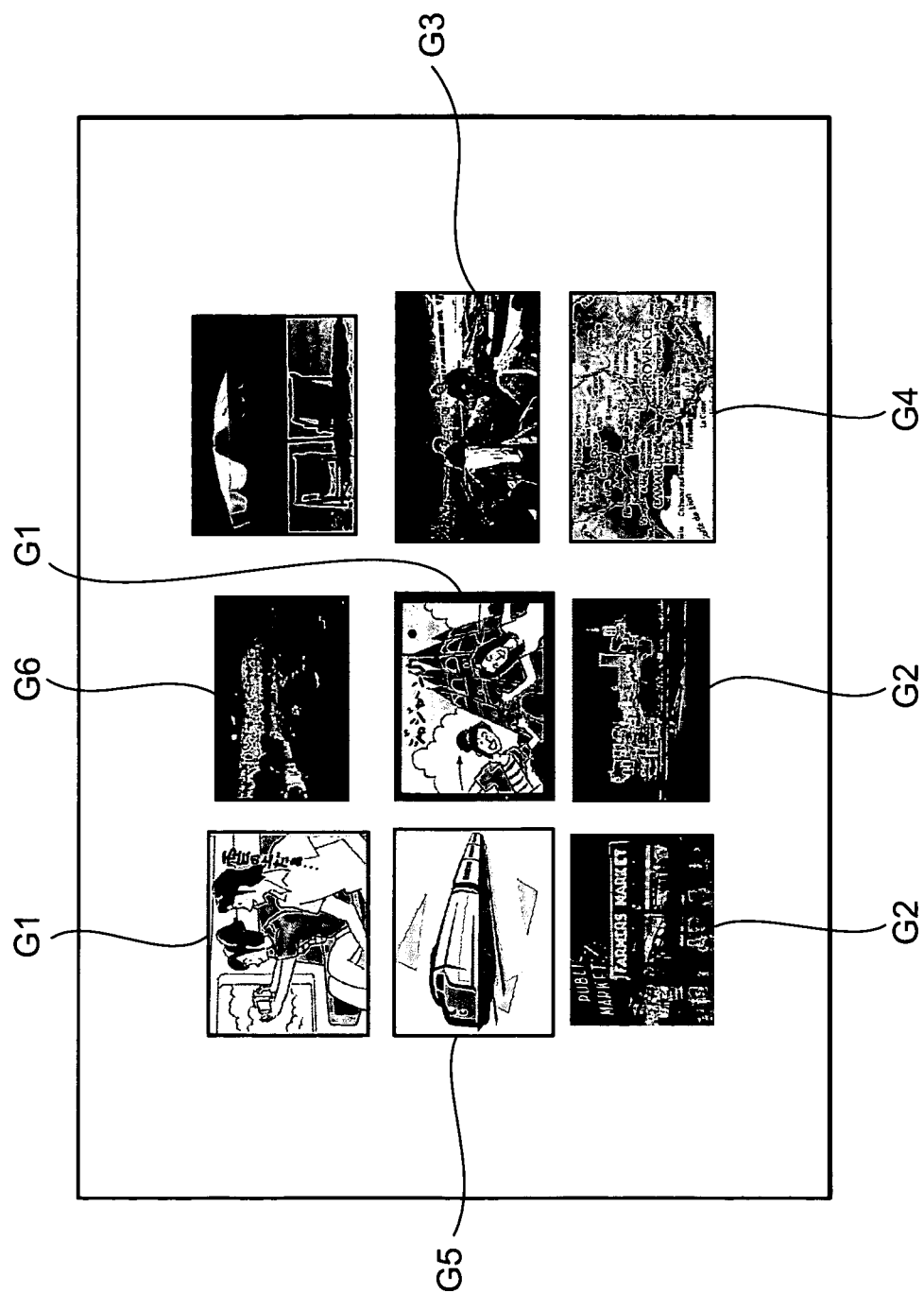
Figure 6:
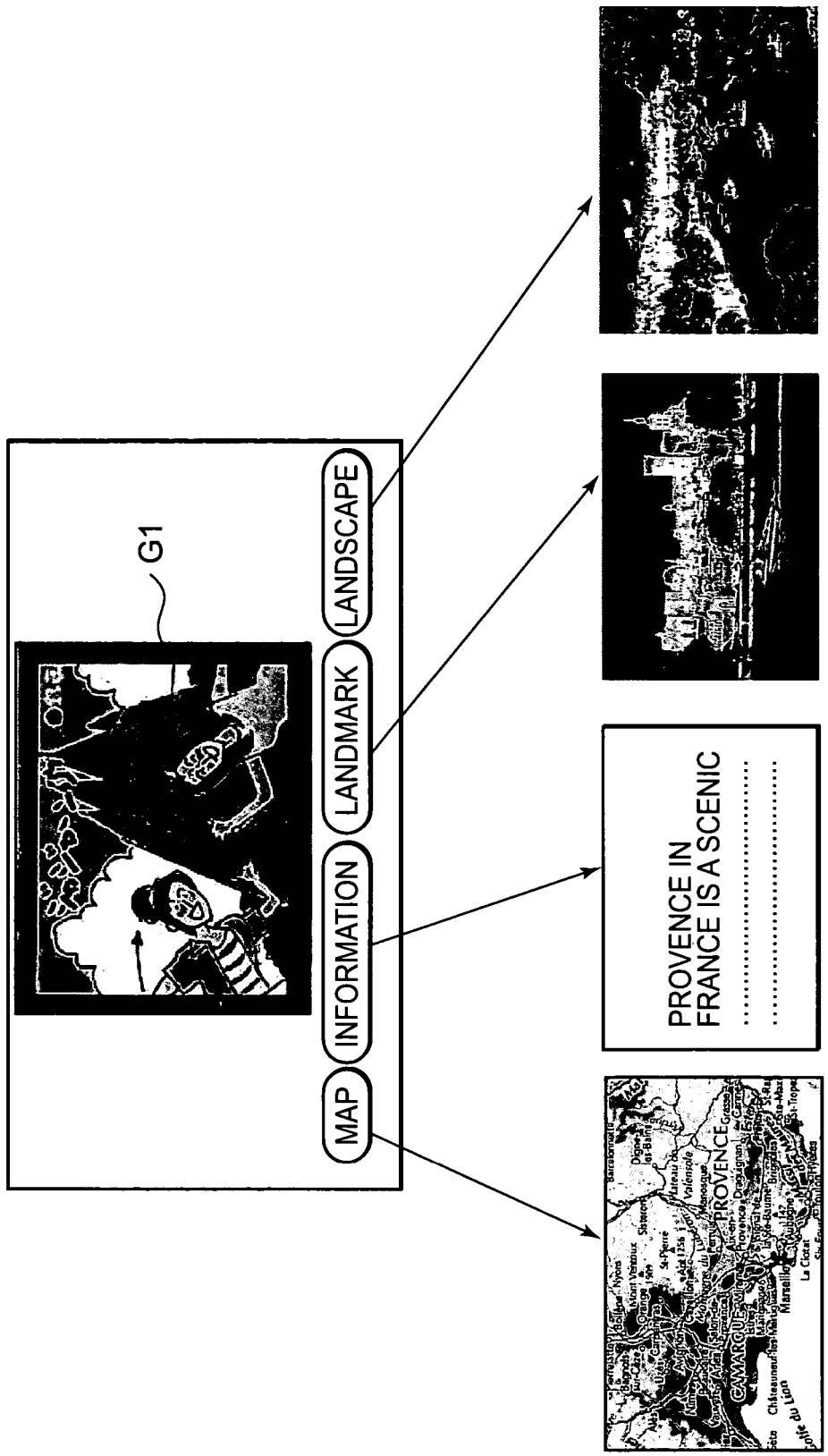
FIG. 6 shows an example of the playback screen in which a map, information, small images of a landmark and a landscape of the sightseeing trip spot are arranged beneath a large image of the image G1 captured by a user.

After that, the electronic album creating apparatus creates an electronic album in accordance with the flow chart in FIG. 2. Then, the electronic album added the sightseeing information created by edition is recorded, via the read/write section 21, on a new recording medium, that is, a DVD, such as a DVD-R, DVD-RW, DVD+RW, and DVD-ROM, or a CD-ROM, such as a CD-R, and a CD-RW, or a floppy disk (registered trademark).

In this case, the recording may be performed on the recording medium recorded by the electronic camera 1 in an adding or overwriting manner.

In addition, in this case, the reading of captured images from the recording medium of the electronic camera 1 and the sightseeing information from the recording medium 2 may be performed each time when required, and the writing to the recording medium after editing may be performed each time when required.

Further, in the example of FIG. 7, two read/write sections 21 may be provided, and into one of the read/write sections 21, the recording medium of the electronic camera 1 may be loaded, while into the other, the recording medium 2 on which sightseeing spot information is recorded may be loaded. In this manner, there is no longer a need to often change the loaded recording medium until editing is finished.

Meanwhile, when actually editing video, the most troublesome and time-consuming work is editing the opening image, in other words, the beginning part of the video. For example, at the beginning of video captured on a sightseeing trip, if a title like "Trip to France" is superimposed on the most famous place at that sightseeing spot, and showed it with background music, it would indeed look like a professional edited video image.

In the present example, as material information, a plurality of opening images that are edited in advance are recorded on the recording medium with situational information such as location, date and time added thereto. The user is displayed on the screen similar to the selection of the desired sightseeing information type in FIG. 3 and is configured so as to be selectable, or it is possible to display by selecting with the situational information of the images of the user.

Subsequently, following the video in the beginning, images captured by the user, that is, if in the case of video images, the video images are shown along with appropriate background music, and if in the case of still images, the still images are shown sequentially along with background music much like what is referred to as a slideshow. With this arrangement, the user may feel like watching an electronic album or video album which has been comfortably and meticulously edited.

Then, while orderly and chronologically showing the images captured by the user, "introductions of places of interest," "country pride" or the like suiting the place, date or time is inserted along with narrations and music as if inserting commercial messages during a program. As a result, the album becomes more exciting, and allows for enjoyable viewings. Further, even for the ending images, that is the last part, a plurality of material information is prepared, and it is configured to be able to be used similar to the beginning part.

It is to be noted that the present invention is not limited to the examples described above, and other various configurations may of course be adopted without departing from the scope of the present invention.

Industrial Applicability

According to the present invention, one is possible to create an original electronic album by oneself relatively easily.

The invention claimed is:

1. A mobile recording medium manufactured specifically for a place by a company for creating an original electronic album of the place, the mobile recording medium comprising:
   material information provided by the company that is pre-recorded on the recording medium, the material information including at least one of text, an image, a video, audio, and a map relating to the place; and
   a program which, when executed by a processor, causes a system to:
      receive situational information corresponding to one or more images captured at the place with a camera, the situational information including at least one of a location, a date, and a time relating to the place;
      search information recorded on the mobile recording medium using the situational information;
      determine and display a listing of items as a result of the search, the listing of items including the pre-recorded material information;
      receive a user selection of the pre-recorded material information from the listing; and
      combine the pre-recorded material information selected by the user with the one or more images captured with the camera to create the electronic album of the place, the electronic album comprising both the pre-recorded material information selected by the user and the one or more images captured with the camera.

2. The mobile recording medium according to claim 1, wherein the listing of items further includes a plurality of opening videos and the user selection includes a selection of one of the plurality of opening videos.

3. The mobile recording medium according to claim 2, wherein the electronic album is playable to present the selected opening video and automatically present, thereafter, the one or more images in a chronological order.

4. The mobile recording medium according to claim 1, further comprising an ID (identification number), wherein the program causes the system to use the ID to receive updated material information relating to the place via a network.

5. The mobile recording medium according to claim 1, wherein the program, when executed by the processor, further causes the system to simulate playback of the combined pre-recorded material information selected by the user and the one or more images captured with the camera prior to creation of the electronic album.

6. The mobile recording medium according to claim 1, wherein the electronic album is playable, and wherein the program causes the system to combine the pre-recorded material information selected by the user with the one or more images so that playing the electronic album includes simultaneous display of the pre-recorded material information selected by the user and the one or more images captured with the camera.

7. The mobile recording medium according to claim 1, wherein the one or more images includes one or more video images.

8. An electronic album creating apparatus for creating an electronic album relating to a place, the apparatus comprising:
- a first recording medium configured to store one or more images captured at the place with a camera; and
- a second recording medium manufactured specifically for the place by a company configured to store:
  - material information provided by the company that is pre-recorded on the second recording medium, the material information including at least one of text, an image, a video, audio, and a map relating to the place; and
  - a program which, when executed by a processor of the apparatus, causes the apparatus to:
    - receive situational information corresponding to the one or more images, the situational information including at least one of a location, a date, and a time relating to the place;
    - search information stored on the second recording medium using the situational information;
    - determine and display a listing of items as a result of the search, the listing of items including the pre-recorded material information;
    - receive a user selection of the pre-recorded material information from the listing; and
    - combine the pre-recorded material information selected by the user with the one or more images captured with the camera to create the electronic album of the place, the electronic album comprising both the pre-recorded material information selected by the user and the one or more images captured with the camera.

9. The electronic album creating apparatus according to claim 8, wherein the listing of items further includes a plurality of opening videos and the user selection includes a selection of one of the plurality of opening videos.

10. The electronic album creating apparatus according to claim 8, wherein the second recording medium further comprises an ID, wherein the apparatus uses the ID to receive updated material information relating to the place via a network.

11. The electronic album creating apparatus according to claim 8, wherein the apparatus simulates playback of the combined pre-recorded material information selected by the user and the one or more images captured with the camera prior to creation of the electronic album.

12. The electronic album creating apparatus according to claim 8, wherein the electronic album is playable, and wherein the apparatus combines the pre-recorded material information selected by the user with the one or more images so that playing the electronic album includes simultaneous display of the pre-recorded material information selected by the user and the one or more images captured with the camera.

13. The electronic album creating apparatus according to claim 8, wherein the one or more images includes one or more video images.

14. A method of creating an original electronic album of a place, the method comprising:
- receiving situational information corresponding to one or more images captured at the place with a camera, the situational information including at least one of a location, a date, and a time relating to the place;
- searching information provided by a company and pre-recorded on a recording medium using the situational information, the information including material information that includes at least one of text, an image, a video, audio, and a map relating to the place;
- determining and displaying a listing of items as a result of the search, the listing of items including the pre-recorded material information;
- receiving a user selection of the pre-recorded material information from the listing; and
- combining the pre-recorded material information selected by the user with the one or more images captured with the camera to create the electronic album of the place, the electronic album comprising both the pre-recorded material information selected by the user and the one or more images captured with the camera.

15. The method according to claim 14, wherein the listing of items further includes a plurality of opening videos and the user selection includes a selection of one of the plurality of opening videos.

16. The method according to claim 15, further comprising playing the electronic album, wherein playing the electronic album includes displaying the selected opening video and automatically displaying, thereafter, the one or more images in a chronological order.

17. The method according to claim 14, further comprising simulating playback of the combined pre-recorded material information selected by the user and the one or more images captured with the camera prior to creation of the electronic album.

18. The method according to claim 14, further comprising playing the electronic album, wherein playing the electronic album includes simultaneously displaying the pre-recorded material information selected by the user and the one or more images captured with the camera.

19. The method according to claim 14, wherein the one or more images includes one or more video images.

20. The method according to claim 14, further comprising:
- receiving a user input of a comment or title;
- combining the comment or title with the pre-recorded material information selected by the user and the one or more images captured with the camera to create the electronic album of the place; and
- playing the electronic album, including displaying the pre-recorded material information selected by the user, the one more images captured with the camera, and the comment or title.

* * * * *